(12) United States Patent
Takei

(10) Patent No.: US 10,326,384 B2
(45) Date of Patent: *Jun. 18, 2019

(54) DRIVE CONTROLLER, IMAGING APPARATUS AND DRIVE CONTROL METHOD

(71) Applicant: SONY CORPORATION, Tokyo (JP)

(72) Inventor: Tomoya Takei, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,862

(22) Filed: Aug. 4, 2017

(65) Prior Publication Data
US 2017/0338751 A1 Nov. 23, 2017

Related U.S. Application Data

(63) Continuation of application No. 14/499,661, filed on Sep. 29, 2014, now Pat. No. 9,762,149.

(30) Foreign Application Priority Data

Oct. 15, 2013 (JP) .................................. 2013-214726

(51) Int. Cl.
H02N 2/06 (2006.01)
H04N 5/232 (2006.01)
(Continued)

(52) U.S. Cl.
CPC ............... *H02N 2/062* (2013.01); *G03B 3/10* (2013.01); *G03B 5/00* (2013.01); *H02P 25/06* (2013.01);
(Continued)

(58) Field of Classification Search
CPC ......... H01L 27/14634; H01L 27/14616; H01L 27/1461; H01L 27/14614; H01L 27/307;
(Continued)

(56) References Cited

U.S. PATENT DOCUMENTS 7,102,270 B2 9/2006 Ito et al.
7,986,478 B2 7/2011 Yamashita et al.
(Continued)

FOREIGN PATENT DOCUMENTS

JP 2004-056878 A 2/2004
JP 2006-158019 A 6/2006
(Continued)

OTHER PUBLICATIONS

Office Action for JP Patent Application No. 2013-214726, dated Jul. 4, 2017, 05 pages of Office Action Action and 03 pages of English Translation.
(Continued)

*Primary Examiner* — Albert H Cutler
(74) *Attorney, Agent, or Firm* — Chip Law Group

(57) ABSTRACT

There is provided a drive controller including a determination part that compares a target stop position of a movable body, which is driven by a piezoelectric actuator driven by a piezoelectric element expanded and contracted in response to an applied voltage, with a real position of the movable body acquired on the basis of a position sensor, and determines whether or not the target stop position matches with the real position, and a drive control part that turns off energization of the piezoelectric actuator when the target stop position matches with the real position while the movable body is being driven by the piezoelectric actuator.

19 Claims, 12 Drawing Sheets

(51) Int. Cl.
  *G03B 5/00* (2006.01)
  *G03B 3/10* (2006.01)
  *H02P 25/06* (2016.01)
  *H02N 2/02* (2006.01)

(52) U.S. Cl.
  CPC . *H04N 5/23212* (2013.01); *G03B 2205/0046* (2013.01); *G03B 2205/0061* (2013.01); *H02N 2/025* (2013.01)

(58) Field of Classification Search
  CPC ............ H01L 29/7869; H01L 27/1225; H04N 5/2253; H04N 5/374; H04N 5/3745; H04N 5/378
  See application file for complete search history.

(56) References Cited

U.S. PATENT DOCUMENTS

| | | | |
|---|---|---|---|
| 9,762,149 B2* | 9/2017 | Takei | G03B 3/10 |
| 2002/0095226 A1 | 7/2002 | Suzuki et al. | |
| 2006/0061233 A1 | 3/2006 | Ito et al. | |
| 2008/0111446 A1* | 5/2008 | Matsuki | H02N 2/025 310/310 |
| 2009/0021848 A1 | 1/2009 | Lee | |
| 2013/0021027 A1* | 1/2013 | Ausserlechner | G01R 33/075 324/251 |
| 2014/0043701 A1 | 2/2014 | Motomura | |
| 2015/0029387 A1 | 1/2015 | Kawai et al. | |

FOREIGN PATENT DOCUMENTS

| | | |
|---|---|---|
| JP | 2009-025818 A | 2/2009 |
| JP | 2011-120403 A | 6/2011 |
| JP | 2012-023917 A | 2/2012 |

OTHER PUBLICATIONS

Office Action for JP Patent Application No. 2013-214726, dated Jul. 4, 2017, 05 pages of Office Action Action and 05 pages of English Translation.

Notice of Allowance and Fees Due (PTOL-85) for U.S. Appl. No. 14/499,661, dated Aug. 9, 2017, 02 pages.

Notice of Allowance and Fees Due (PTOL-85) for U.S. Appl. No. 14/499,661, dated Jul. 19, 2017, 04 pages.

Notice of Allowance and Fees Due (PTOL-85) for U.S. Appl. No. 14/499,661, dated May 5, 2017, 05 pages.

Final Rejection for U.S. Appl. No. 14/499,661, dated Feb. 27, 2017, 18 pages.

Non-Final Rejection for U.S. Appl. No. 14/499,661, dated Sep. 13, 2017, 19 pages.

Advisory Action (PTOL-303) for U.S. Appl. No. 14/499,661, dated Aug. 1, 2016, 04 pages.

Final Rejection for U.S. Appl. No. 14/499,661, dated May 25, 2016, 20 pages.

Non-Final Rejection for U.S. Appl. No. 14/499,661, dated Dec. 11, 2015, 13 pages.

* cited by examiner

DRIVE CONTROLLER, IMAGING APPARATUS AND DRIVE CONTROL METHOD

CROSS REFERENCE TO RELATED APPLICATIONS

The present application is a continuation application of U.S. patent application Ser. No. 14/499,661, filed Sep. 29, 2014, which claims priority from prior Japanese Priority Patent Application JP 2013-214726 filed in the Japan Patent Office on Oct. 15, 2013, the entire contents of which are hereby incorporated by reference.

BACKGROUND

The present disclosure relates to a drive controller that controls a stop of a movable body driven by a drive part, an imaging apparatus and a drive control method.

For an autofocus function, an electrically-driven zoom function and a camera shake correction mechanism, an electromagnetic conversion motor using a coil and a magnet such as a stepping motor, a voice coil motor and a DC motor is often used. In the electromagnetic conversion motor, it is difficult to keep the position when energization of the motor is turned off. In particular, when the energization is suddenly turned OFF in the middle of high-speed drive, the motor is affected by inertia of a lens movable part and is stopped at a position past the position at which the energization is turned off. Therefore, generally from a viewpoint of saving power or the like, when turning off the energization, it may be necessary to turn off the energization only after the movable body is completely stopped after a stop is instructed.

In a stepping motor for instance, as disclosed in JP2006-158019A, after the end of microstep drive, a rotor is driven to make an excitation position of the rotor coincide with an excitation position of a stator, and then energization of the motor is turned off. This prevents the motor from stopping out of an originally intended position at which the motor should actually be stopped due to detent torque that the motor has.

SUMMARY

However, in the case of tentatively stopping a motor, then moving the motor further to a stably stopped position, and turning off the energization of the motor thereafter as described in JP2006-158019A, it takes a very long time from drive to turning off of the energization. For instance, when using such a method in an autofocus (AF) mechanism, autofocusing time (that is, a shutter time lag) becomes extremely long. Not to mention, when the energization of the motor is suddenly turned off during high-speed drive, inertia causes a state called step-out in which synchronization of an energization signal and a motor rotation angle is shifted, and the motor not only passes by a stop position but also loses the motor rotation angle (that is, a focus position). Also, when the motor is disturbed by an impact or the like while the energization of the motor is off, the position is shifted to a stably stopped position different from an original stop position or slight shift from the original stop position is generated even within the stably stopped position close to the desired stop position.

Similarly in a DC motor, even when the energization is turned off after the motor is stopped, the misalignment occurs due to the influence of the detent torque, and when the energization of the motor is turned off during the high-speed drive, the motor is stopped at a position past the original stop position due to the influence of the inertia. The overshoot is not stable due to the influence of variation of loads of the motor and a gear mechanism, and it is extremely difficult to predict the overshoot and perform correction beforehand for turning off the energization of the motor before the original stop position.

In a voice coil motor, in its principle of controlling a position of a movable body using feedback control using information from a position sensor, the position of the movable body is completely unfixed when the energization of the motor is turned off to begin with. Also, even in the state of stopping by controlling the stop by servo drive, the movable body is not completely stopped due to the influence of signal noise of the position sensor that detects a real position of the movable body or the like, and maintains the positions while finely moving. Therefore, compared to the case that the energization is turned off, the motor is degraded in stop accuracy.

In such a manner, it is difficult to quickly stop the motor during the high-speed drive in a short time while maintaining high stop accuracy, and not to mention, turning off the energization of the motor during drive causes a large misalignment of the movable body. Further, the motor is easily influenced by disturbance such as signal noise, an impact or the like, the misalignment easily occurs, and position accuracy when the movable body is stopped is affected.

Accordingly, the present disclosure proposes a new and improved drive controller, imaging apparatus and drive control method capable of stopping a drive part that drives the movable body quickly with high accuracy and achieving power consumption reduction by turning off the energization of the drive part.

According to an embodiment of the present disclosure, there is provided a drive controller including a determination part that compares a target stop position of a movable body, which is driven by a piezoelectric actuator driven by a piezoelectric element expanded and contracted in response to an applied voltage, with a real position of the movable body acquired on the basis of a position sensor, and determines whether or not the target stop position matches with the real position while the movable body is being driven by the piezoelectric actuator, and a drive control part that turns off energization of the piezoelectric actuator when the target stop position matches with the real position.

According to another embodiment of the present disclosure, there is provided an imaging apparatus including an imaging unit, a lens part composed of one or more lenses that transmit light incident on the imaging unit, a plurality of drive parts that move a movable body that holds the imaging unit and the lenses respectively and moves in a predetermined direction respectively, and a plurality of drive control parts that control the individual drive parts respectively. At least one of the drive parts is a piezoelectric actuator that drives the movable body with a piezoelectric element expanded and contracted in response to an applied voltage. The drive control part of the piezoelectric actuator includes a determination part that compares a target stop position of the movable body with a real position of the movable body acquired on the basis of a position sensor, and determines whether or not the target stop position matches with the real position while the movable body is being driven by the piezoelectric actuator, and a drive control part that turns off energization of the piezoelectric actuator when the target stop position matches with the real position.

According to another embodiment of the present disclosure, there is provided a drive control method including comparing a target stop position of a movable body, which is driven by a piezoelectric actuator driven by a piezoelectric element expanded and contracted in response to an applied voltage, with a real position of the movable body acquired on the basis of a position sensor, and determining whether or not the target stop position matches with the real position while the movable body is being driven by the piezoelectric actuator, and turning off energization of the piezoelectric actuator when the target stop position matches with the real position.

According to the present disclosure, when moving the movable body moved by a piezoelectric actuator to a target stop position, the drive controller compares the target stop position of the movable body with a real position, and when determining that they match during the drive of the movable body by the piezoelectric actuator, turns off the energization to the piezoelectric actuator. Thus, the time required for moving the movable body to the target stop position can be shortened and the movable body can be stopped at the target stop position with high accuracy. By turning off the energization of the piezoelectric actuator, the power consumption reduction can be also achieved.

As described above, according to the present disclosure, the drive part that drives the movable body can be stopped quickly with high accuracy, and the power consumption reduction by turning off the energization of the drive part can be achieved. Also, the above-described effects are not necessarily definite, and together with the above-described effects, or instead of the above-described effects, one of effects indicated in this specification or other effects that can be recognized from this specification may be demonstrated.

DETAILED DESCRIPTION OF THE EMBODIMENT(S)

Figure 1:
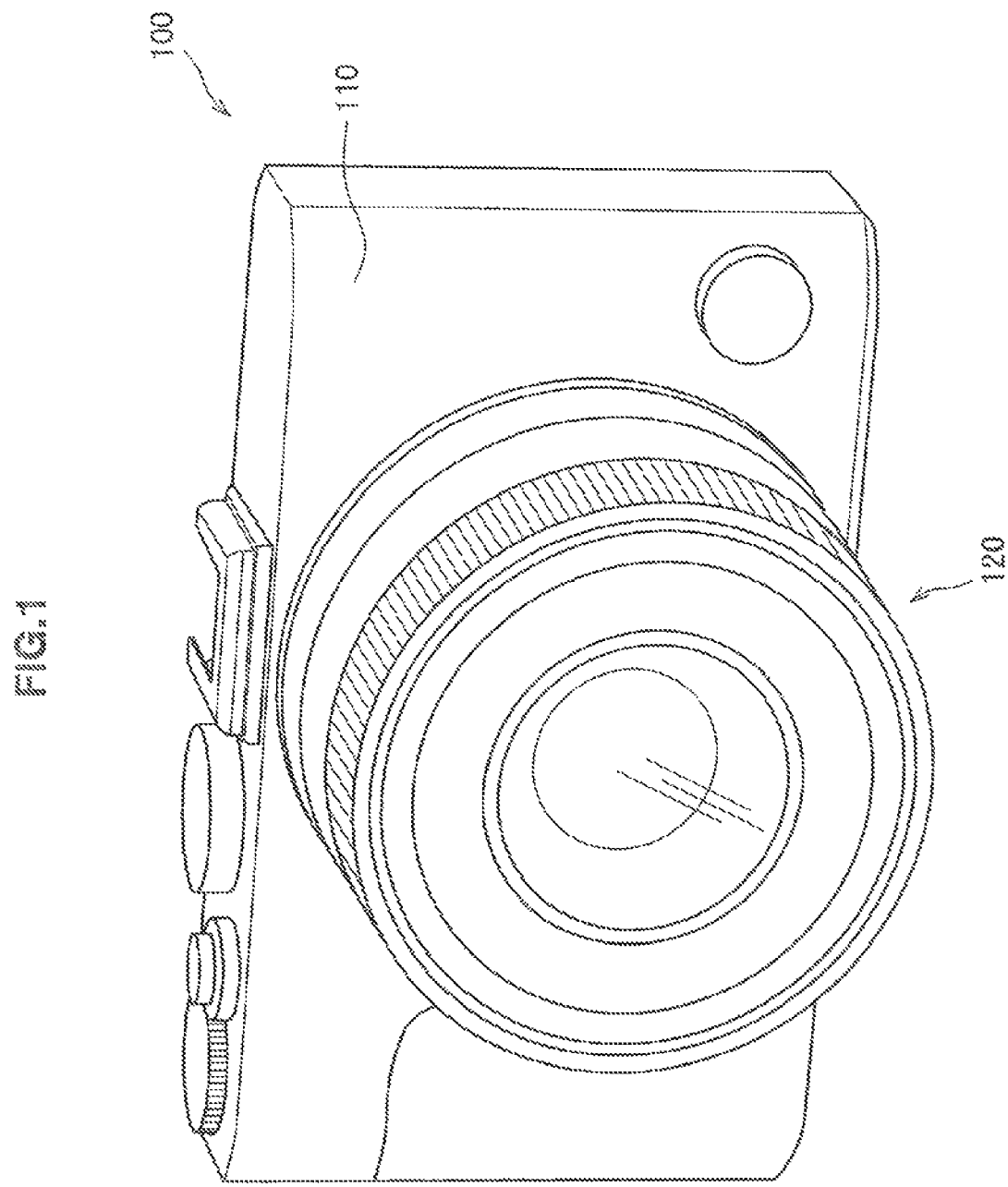
FIG. 1 is a schematic perspective view illustrating a front surface side appearance of an imaging apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Descriptions will be given in the following order.
1. First embodiment (drive stop control by comparison between target stop position and real position of movable body)
   1.1. Configuration of imaging apparatus
   1.1.1. Entire configuration of imaging apparatus
   1.1.2. Configuration of drive part
   1.1.3. Movement of lens frame by piezoelectric actuator
   1.2. Drive control of drive part
   1.2.1. Outline of drive control by drive controller
   1.2.2. Configuration of drive controller
   1.2.3. Focus lens drive stop control by drive controller
   1.3. Summary
2. Second embodiment (timing of turning off energization of piezoelectric actuator)
3. Third embodiment (correction of target stop position)

1. First Embodiment

[1.1 Configuration of Imaging Apparatus]

Figure 2:
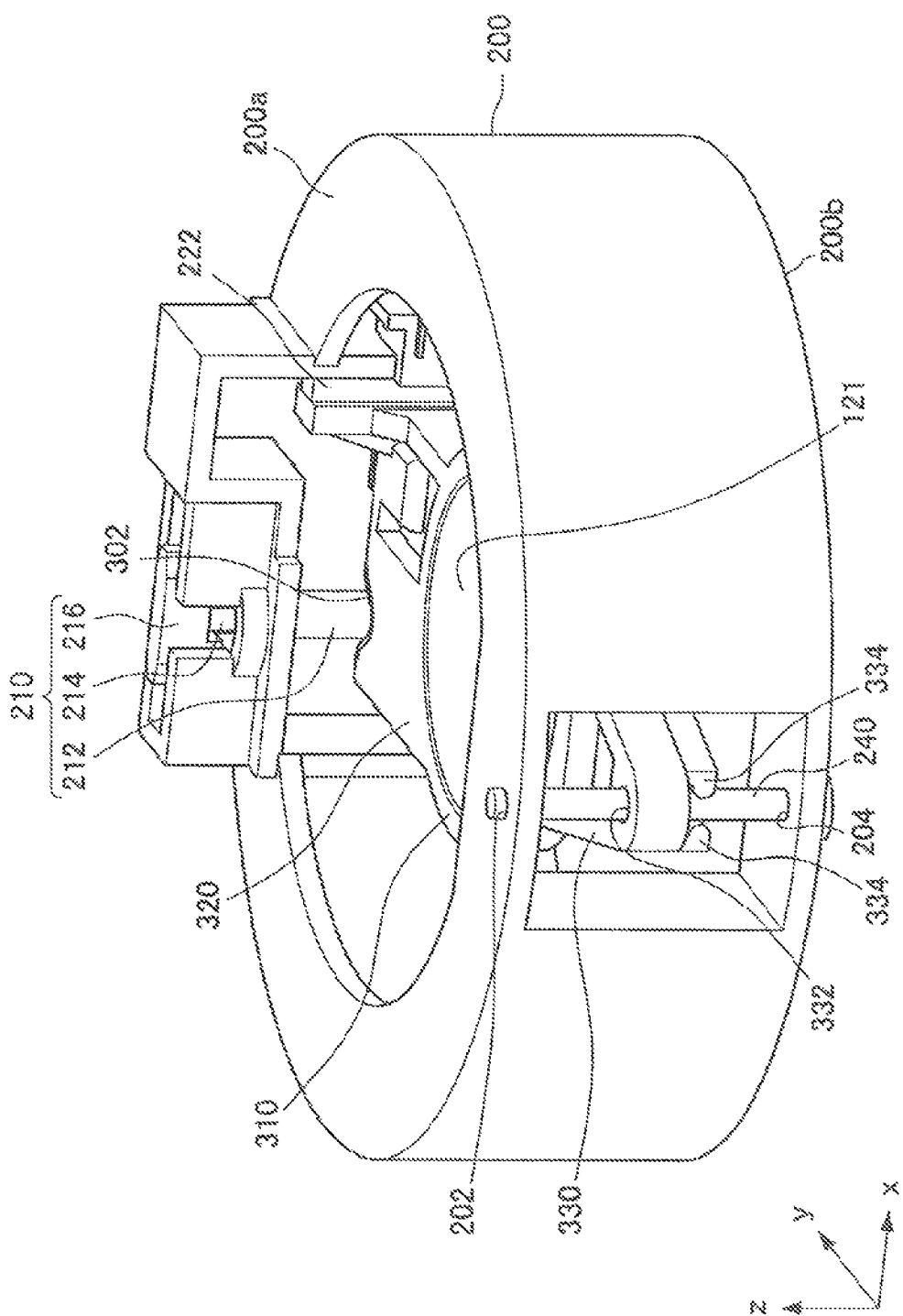
FIG. 2 is a perspective view illustrating a lens drive mechanism of a focus lens which is one of drive parts of the imaging apparatus according to the embodiment.
Figure 3:
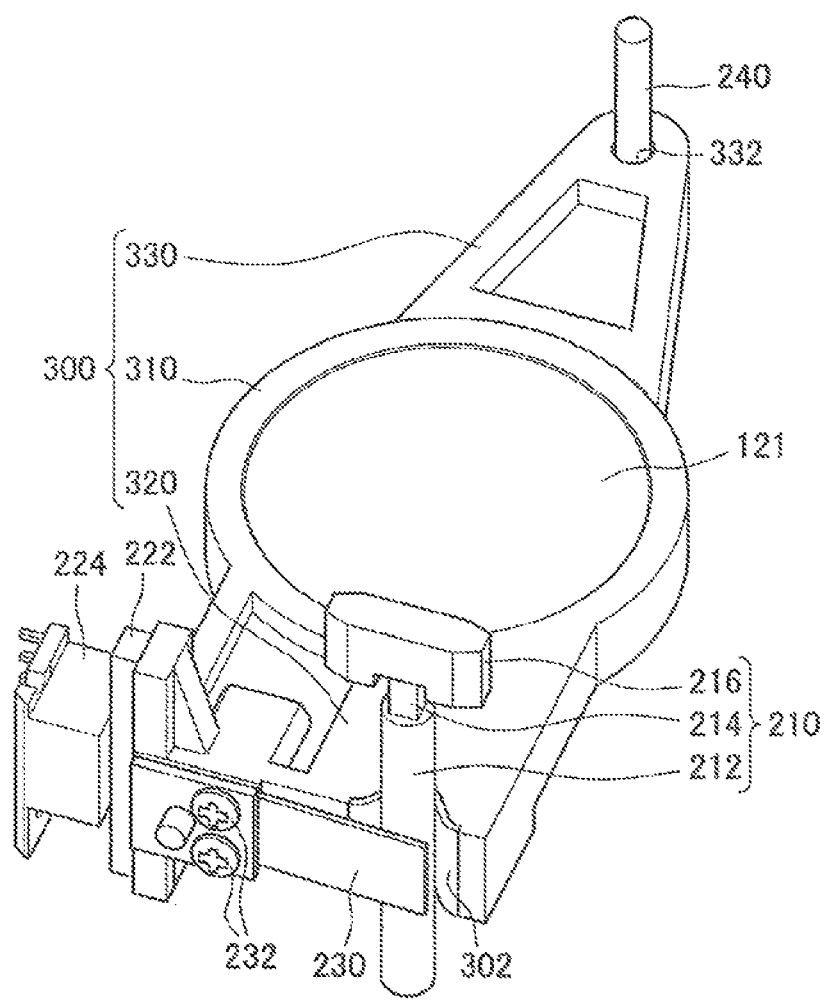
FIG. 3 is a perspective view illustrating a lens frame which is a movable body driven by the lens drive mechanism according to the embodiment.
Figure 4:
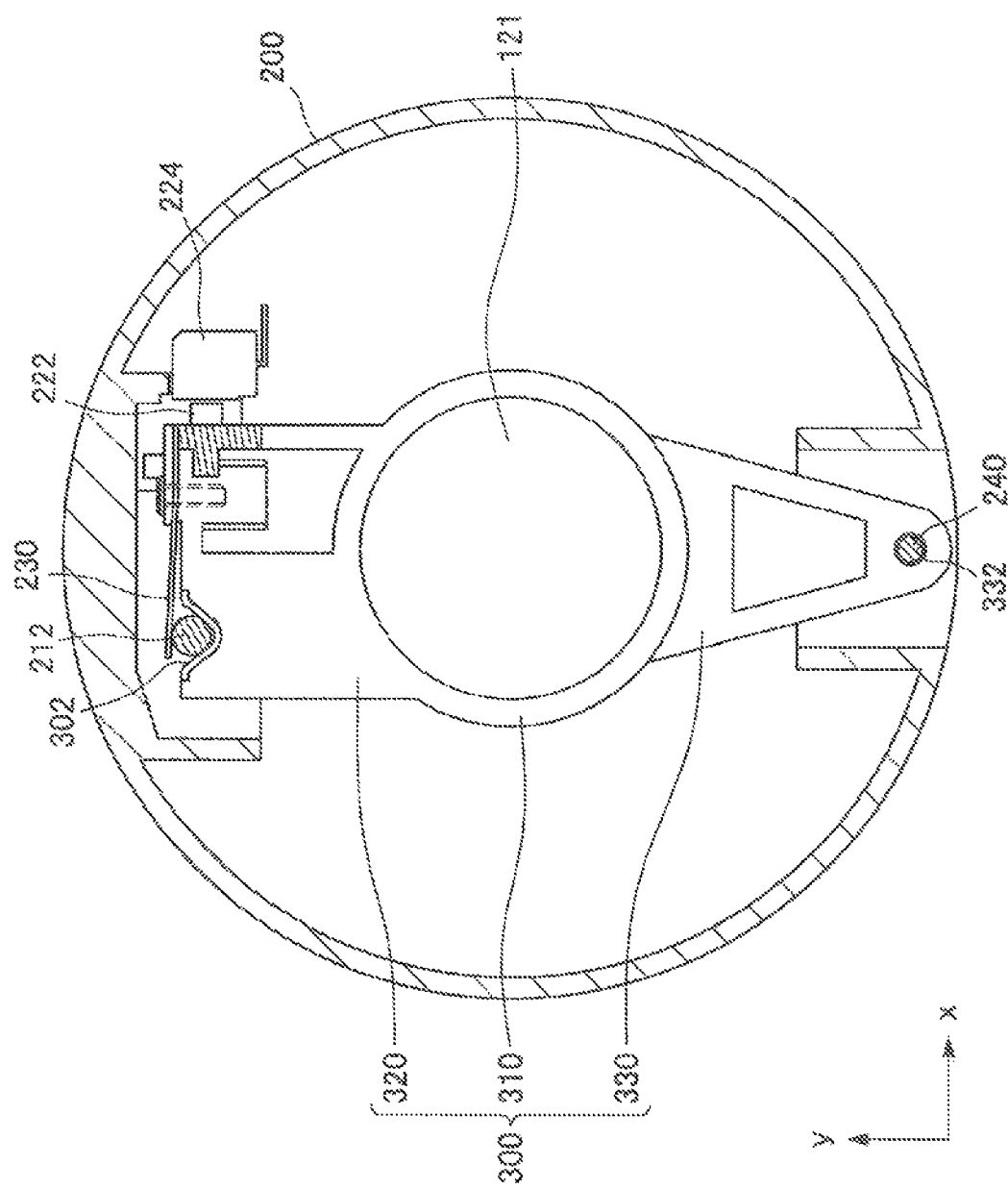
FIG. 4 is a planar sectional view of the lens drive mechanism of the imaging apparatus according to the embodiment.

First, with reference to FIG. 1-FIG. 4, one configuration example of an imaging apparatus according to a first embodiment of the present disclosure will be described. FIG. 1 is a schematic perspective view illustrating a front surface side appearance of the imaging apparatus according to the present embodiment. FIG. 2 is a perspective view illustrating a lens drive mechanism of a focus lens 121 which is one of drive parts of the imaging apparatus according to the present embodiment. FIG. 3 is a perspective view illustrating a lens frame 300 which is a movable body driven by the lens drive mechanism according to the present embodiment. FIG. 4 is a planar sectional view of the lens drive mechanism of the imaging apparatus according to the present embodiment.

(1.1.1. Entire Configuration of Imaging Apparatus)

In the present embodiment, the case of application to the drive control of the focus lens 121 of a digital still camera 100 illustrated in FIG. 1 will be described. The digital still camera 100 includes a body part 110 having a control part that controls the entire imaging apparatus, an imaging device, a signal processing part that processes image signals acquired by the imaging device and the like, and a lens part 120 having a zoom lens, a focus lens, a correction lens part and the like.

The body part 110 has the control part that controls the entire imaging apparatus, the imaging device, the signal processing part that processes image signals that are electric signals corresponding to image data acquired by the imaging device and the like. As the imaging device, for instance, the imaging device such as a charge coupled device (CCD) type image sensor, a complementary metal oxide semiconductor (CMOS) type image sensor and the like is usable. In the case of using the CMOS type image sensor as the imaging device, the imaging device converts an optical image formed on an imaging surface to an electric signal.

The electric signal which is an image signal is subjected to noise elimination processing and gain control processing of turning an imaging signal to a desired signal level, then converted from an analog signal to a digital signal, and outputted to the signal processing part. The signal processing part carries out, to the inputted electric signal, defect correction processing of correcting a signal of a defective pixel in the imaging device, shading correction processing of correcting a reduction in peripheral light quantity of the lens, and processing of white balance adjustment, luminance correction and the like. The electric signal processed by the signal processing part is outputted to an output part such as a display for instance as image data.

The lens part 120 includes the zoom lens that varies magnification, the focus lens that carries out focusing, the correction lens part that moves a position of the optical image formed on the imaging surface of the imaging device on the imaging surface and the like. The zoom lens, the focus lens and the correction lens part may be driven on the basis of lens control signals from the control part, or may be driven by user's operation. Also, the lens part 120 includes a mechanical shutter that mechanically adjusts an exposure amount to the imaging surface of the imaging device, and a diaphragm mechanism that adjusts a light quantity of the optical image formed on the imaging surface of the imaging device.

Lens positions of the zoom lens and the focus lens, a displacement state of the correction lens part, a setting position of the diaphragm mechanism and the like are detected by an optical system sensor, and outputted to the control part as position signals. Also, the lens part is provided with a driver that drives the zoom lens, the focus lens, the correction lens part, the diaphragm mechanism and the like on the basis of control signals from the control part.

(1.1.2. Configuration of Drive Part)

Such a digital still camera 100 has a drive part that moves the lens and the imaging device to a predetermined position, and the drive part is used for focusing of the lens and for shake correction of the imaging device. As one configuration example of the drive part, the drive part that drives the focus lens 121 will be described on the basis of FIG. 2-FIG. 4.

The drive part that drives the focus lens 121 includes, as illustrated in FIG. 2, a fixing member 200 fixed to the digital still camera 100, and the lens frame 300 that supports the focus lens 121 and is provided on the fixing member 200 movably in an optical axis direction. The focus lens 121 and the lens frame 300 are also called the movable body.

The fixing member 200 is a roughly cylindrical member and includes annular surfaces 200a, 200b projected toward a center axis at both ends of an opening. At a hollow part of the fixing member 200, the lens frame 300 is arranged. The fixing member 200 includes a drive shaft 212 and a sub shaft 240 of a piezoelectric actuator 210 provided in parallel with an optical axis respectively at positions roughly facing each other in a radial direction. By the drive shaft 212 and the sub shaft 240, the lens frame 300 is supported movably in an optical axis direction. The optical axis direction is identical to a center axis direction of the fixing member 200.

The piezoelectric actuator 210 includes a piezoelectric element 214 expanded and contracted in response to an applied voltage, the drive shaft 212 connected to one end side in an expanding/contracting direction of the piezoelectric element 214, and a weight 216 connected to the other end side in the expanding/contracting direction of the piezoelectric element 214. The piezoelectric element 214 and the drive shaft 212, and the piezoelectric element 214 and the weight 216 are fixed with an adhesive agent for instance.

The drive shaft 212 is a narrow round shaft member for instance. The drive shaft 212 is inserted to drive shaft support holes 201, 203 respectively formed on the annular surfaces 200a, 200b of the fixing member 200, and is slidably supported. Also, as illustrated in FIG. 4, with the drive shaft 212, a sliding contact surface 302 of the lens frame 300 is in contact between the drive shaft support holes 201, 203.

A drive shaft 212 is urged toward a sliding contact surface 302 by an urging member 230 fixed to the lens frame 300 with a fixing member 232 such as a screw, and is frictionally connected with the lens frame 300. Since the drive shaft 212 and the sliding contact surface 302 of the lens frame 300 are frictionally connected, the lens frame 300 can be moved together with the drive shaft 212 moved in response to a piezoelectric element 214. For the urging member 230, a leaf spring or the like for instance is usable. The urging member 230 is arranged so that a direction of urging force that urges the drive shaft 212 turns to the direction where a sub shaft 240 is arranged. By the urging member 230, it is possible to suppress inclination of the lens frame 300 and movement of the lens frame 300 in directions other than a driving direction.

By frictional force generated between the drive shaft 212 and the sliding contact surface 302 by the urging force of the urging member 230, even in the state that the energization of the piezoelectric actuator 210 is turned off, positions of the drive shaft 212 and the sliding contact surface 302 can be held so as not to be shifted. Thus, the drive shaft 212 can be provided without play. The frictional force is set at a value sufficiently large for weight of the movable body composed of the focus lens 121 and the lens frame 300. That is, the frictional force is set at such a value that the drive shaft 212 and the lens frame 300 can be held without a misalignment even against impact force when the camera is hit and inertia generated when the movable body is suddenly stopped during drive. In this way, the drive shaft 212 functions as a vibration member that drives the movable body, and also functions as a support member that supports the lens frame 300 in an axial direction.

The piezoelectric element 214 is expanded and contracted by a driving pulse voltage applied between electrodes, and generates reciprocating vibrations at different speeds. When the reciprocating vibrations of the piezoelectric element 214 are transmitted to the drive shaft 212, the lens frame 300 frictionally connected to the drive shaft 212 is moved in a direction of the vibrations at a low speed by asymmetry of the reciprocating vibrations of the drive shaft 212.

A weight 216 is a member having predetermined weight, and the piezoelectric actuator 210 is fixed to the fixing member 200 through the weight 216. The weight 216 is formed into a block shape for instance.

The sub shaft 240 is a narrow round shaft member for instance. The sub shaft 240 is inserted and fixed to sub shaft support holes 202 and 204 respectively formed on the annular surfaces 200a, 200b of the fixing member 200. Also, the sub shaft 240 is inserted to a guide hole 332 of the lens frame 300 between the sub shaft support holes 202, 204. The lens frame 300 is provided movably in the optical axis direction along the sub shaft 240.

In the present embodiment, the drive shaft 212 and the sub shaft 240 are arranged so as to hold a centroid of the movable body including the lens 121 and the lens frame 300 therebetween. In this way, by arranging the centroid of the movable body on a straight line connecting the drive shaft 212 and the sub shaft 240, force and moment applied to the movable body can be supported with the minimum force by the drive shaft 212 and the sub shaft 240. The drive device according to an embodiment of the present disclosure is not limited to the example, and the drive shaft 212 and the sub shaft 240 may be arranged adjacently for instance.

Also, the fixing member 200 is provided with a magnetic sensor 224 as a position sensor that detects a position of the lens frame 300 holding the focus lens 121. The magnetic sensor 224 is provided so as to face a magnet 222 provided on the lens frame 300 along the optical axis direction. When the lens frame 300 is moved in the optical axis direction in response to the vibrations of the piezoelectric actuator 210, a position of the magnet 222 is also moved together with the lens frame 300. The magnetic sensor 224 specifies the position of the lens frame 300 by detecting intensity of a magnetic field that changes depending on the position of the magnet 222.

The lens frame 300 is, as illustrated in FIGS. 2 to 4, a member that is arranged at the hollow part of the fixing member 200 and supports the focus lens 121. The lens frame 300 includes a lens holding part 310 that holds the focus lens 121, a first arm part 320 that is extended from the lens holding part 310 to the side of the drive shaft 212, and a second arm part 330 extended from the lens holding part 310 to the side of the sub shaft 240.

On the first arm part 320, the sliding contact surface 302 that is in contact with the drive shaft 212 and supports it along the axial direction is formed. At this time, the sliding contact surface 302 is, as illustrated in FIG. 4, arranged so as to be held between the drive shaft 212 and the sub shaft 240 in the view from a plane. The sliding contact surface 302 is frictionally connected with the drive shaft 212 urged toward a direction in which the sub shaft 240 is arranged by an urging member 230. Also, the sliding contact surface 302 is in contact with an outer peripheral surface of the drive shaft 212 at a plurality of parts, and is formed such that a cross sectional shape in a direction orthogonal to the optical axis is an almost V shape or an almost U shape for instance.

In this way, by arranging the sliding contact surface 302 in a shape to be in contact with an outer peripheral surface of the drive shaft 212 at a plurality of parts between the drive shaft 212 and the sub shaft 240, the lens frame 300 is prevented from being greatly moved in directions other than a driving direction of the drive shaft 212 (that is, an optical axis direction) due to an impact or the like. Note that, the position of the lens frame 300 is normally regulated by the urging member 230 and projection parts 334, 334 to be described later. Also, generation of reaction against the urging force of the urging member 230 can be reduced as well. A first arm part 320 is provided with a magnet 222 so as to face a magnetic sensor 224 that detects the position of the lens frame 300.

On a second arm part 330, a guide hole 332 to which the sub shaft 240 is to be inserted is formed. The guide hole 332 is provided in order to prevent the lens frame 300 from being inclined due to the fall of the digital still camera 100 or the like and giving an impact to the piezoelectric element 214. Also, in the drive part according to the present disclosure, the guide hole 332 may not be provided all the time. An inner diameter of the guide hole 332 is larger than an outer diameter of the sub shaft 240, and the drive shaft 212 and the sub shaft 240 originally arranged in parallel are formed so as to have such a clearance that the sub shaft 240 and the guide hole 332 are not brought into contact even when considering inclination of the sub shaft 240 that is generated within dimensional tolerance of components.

Figure 5:
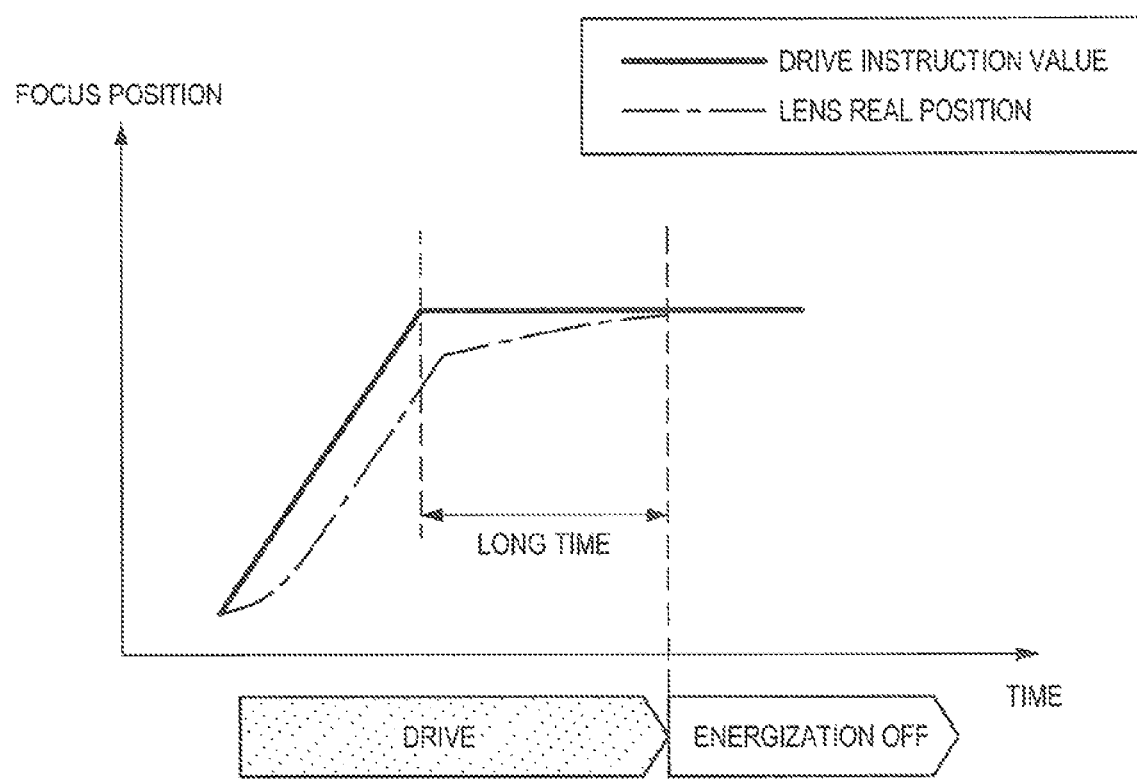
FIG. 5 is an explanatory diagram illustrating a deceleration operation of the focus lens generated during servo control.

Also, the second arm part 330 includes a pair of projection parts 334, 334 in contact with an outer peripheral surface of the sub shaft 240 so as to hold the sub shaft 240 therebetween. For the projection parts 334, 334, as illustrated in FIG. 5, the shape viewed from the front is formed into a roughly semicircular block shape projected to the sub shaft 240 for instance. Thus, the sub shaft 240 can be surely supported with few contact parts. Note that, the shape of the projection parts 334, 334 are not limited to the example, and the shape viewed from the front may be a V shape projected to the sub shaft 240 for instance.

The projection parts 334, 334 are provided so as to hold the sub shaft 240 therebetween from a rotating direction of the lens frame 300 with the drive shaft 212 as the rotation center. Thus, the movement of the lens frame 300 rotating around the drive shaft 212 is regulated. Note that, while the pair of projection parts 334, 334 are provided on a z axis negative direction side with respect to the guide hole 332 as illustrated in FIG. 2 in the present embodiment, the present disclosure is not limited to the example, and the pair of projection parts 334, 334 may be provided on a z axis positive direction side with respect to the guide hole 332. Also, the pair of projection parts 334, 334 may not be arranged closely in a z direction to the guide hole 332 as in the present embodiment, may be arranged at a predetermined distance in the z direction from the guide hole 332 for instance, or may be provided inside the guide hole 332.

(1.1.3. Movement of Lens Frame by Piezoelectric Actuator]

The drive device according to the present embodiment moves the lens frame 300 that holds the focus lens 121 in the optical axis direction with the piezoelectric actuator 210. The drive device is configured such that an optical axis C of the focus lens 121 held by the lens frame 300, the drive shaft 212 and the sub shaft 240 are parallel to one another.

When a voltage is applied to the piezoelectric element 214 of the piezoelectric actuator 210, the piezoelectric element 214 is expanded, contracted and vibrated in a reciprocating manner. When reciprocating vibrations of the piezoelectric element 214 are transmitted to the drive shaft 212, the lens frame 300 frictionally connected to the drive shaft 212 is moved in a low-speed vibrating direction due to asymmetry of the reciprocating vibrations of the drive shaft 212. In this way, the lens frame 300 is moved in the optical axis direction in response to the voltage applied to the piezoelectric element 214.

[1.2. Drive Control of Drive Part]

(1.2.1. Outline of Drive Control by Drive Controller)

In the drive part of such a focus lens 121, the drive of the piezoelectric actuator 210 that moves the focus lens 121 is controlled by the drive controller. In order to stop the focus lens 121 that is moved at a correct focusing position, the drive controller according to the present embodiment executes control so as to turn off a voltage applied to the piezoelectric element 214 when the target stop position of the focus lens 121 matches with a lens real position. Thus, the focus lens 121 can be stopped at the correct focusing position in a short time. In the present disclosure, the target stop position is a value set separately from a drive instruction value which is a target control position of the focus lens 121 by servo control, and is a position where the focus lens 121 should actually be stopped.

Figure 6:
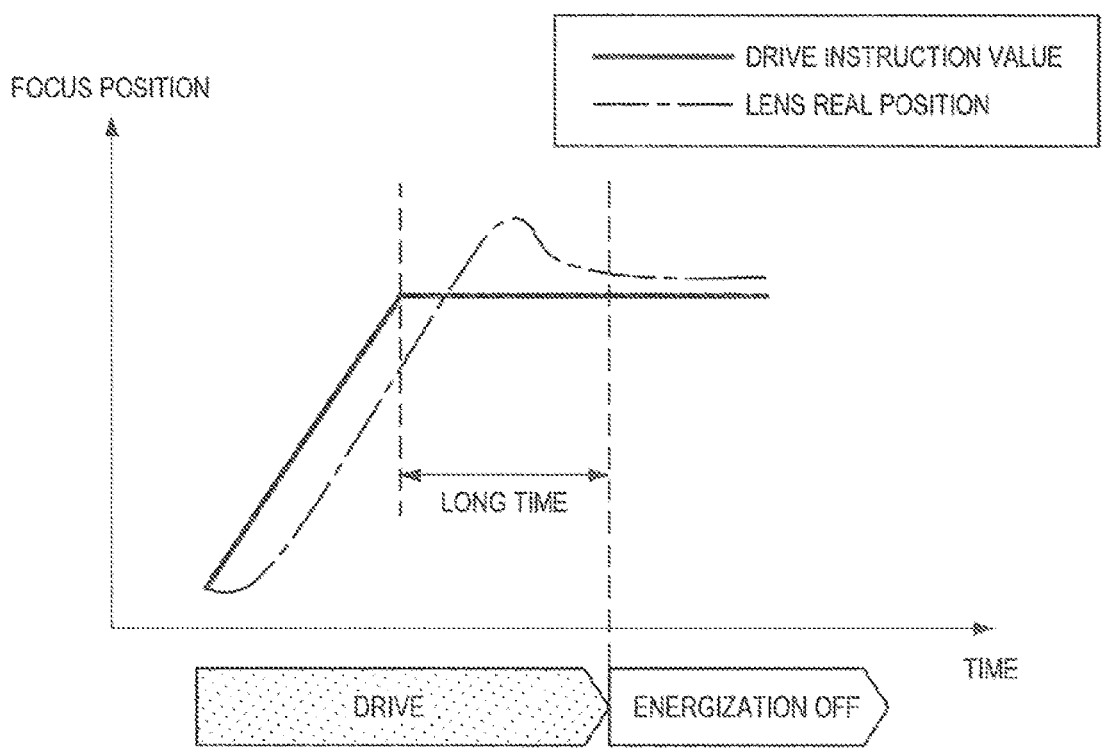
FIG. 6 is an explanatory diagram illustrating an overshoot operation of the focus lens generated during the servo control.

For instance, in the case of receiving an arithmetic result of contrast AF or phase difference AF, moving the focus lens 121 to the focusing position and stopping the focus lens 121, a conventional drive controller executes the servo control of making the focus lens 121 follow so that the real position of the focus lens 121 matches with the drive instruction value based on the arithmetic result. In the servo control, as illustrated in FIG. 5, in terms of characteristics of the servo control, the focus lens 121 is decelerated immediately before the target stop position of the focus lens 121, and it takes time to reach the target stop position. Even though the focus lens 121 is not decelerated depending on a servo parameter, an overshoot as illustrated in FIG. 6 is generated, and as a result, it takes time for convergence until the focus lens 121 is stopped at the focusing position that is the target stop position.

After the movement of the drive part is converged and stopped, when the energization of the drive part is turned off, autofocusing time becomes long, and power consumption increases accordingly. In particular, in a device such as a camera, there is a case that the energization of the drive part of the focus lens 121 has to be turned off to supply power to a shutter due to a restriction of the maximum supply power. In such a case, the autofocusing time becomes extremely long.

Figure 7:
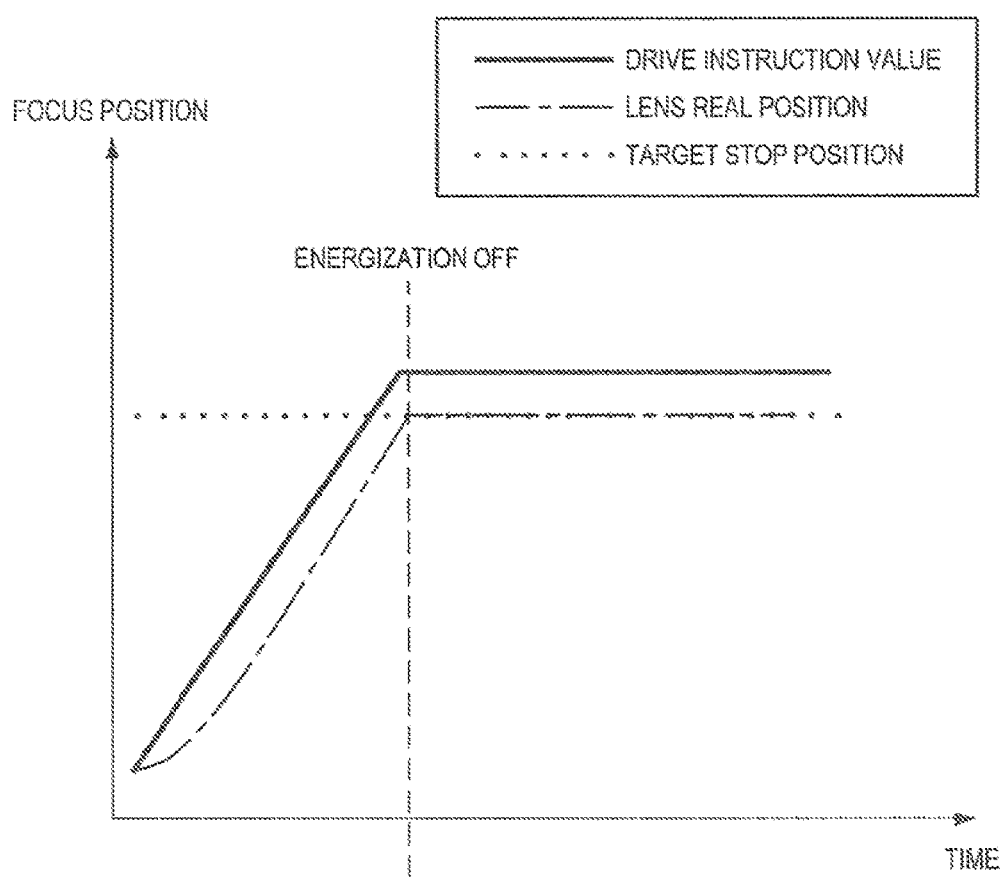
FIG. 7 is an explanatory diagram illustrating stop control of the focus lens according to the embodiment.

Therefore, in the drive controller according to the present embodiment, as illustrated in FIG. 7, the energization of the piezoelectric actuator 212 is turned off when the real position of the focus lens 121 detected by the magnetic sensor 224 is in the target stop position at which the focus lens 121 is actually desired to be stopped. Thus, a decelerating action before the stop position that is generated in terms of characteristics of the servo as illustrated in FIG. 5 is eliminated, the focus lens 121 can be brought close to the focus position while keeping the highest moving speed, and the autofocusing time can be accelerated.

(1.2.2. Configuration of Drive Controller)

Figure 8:
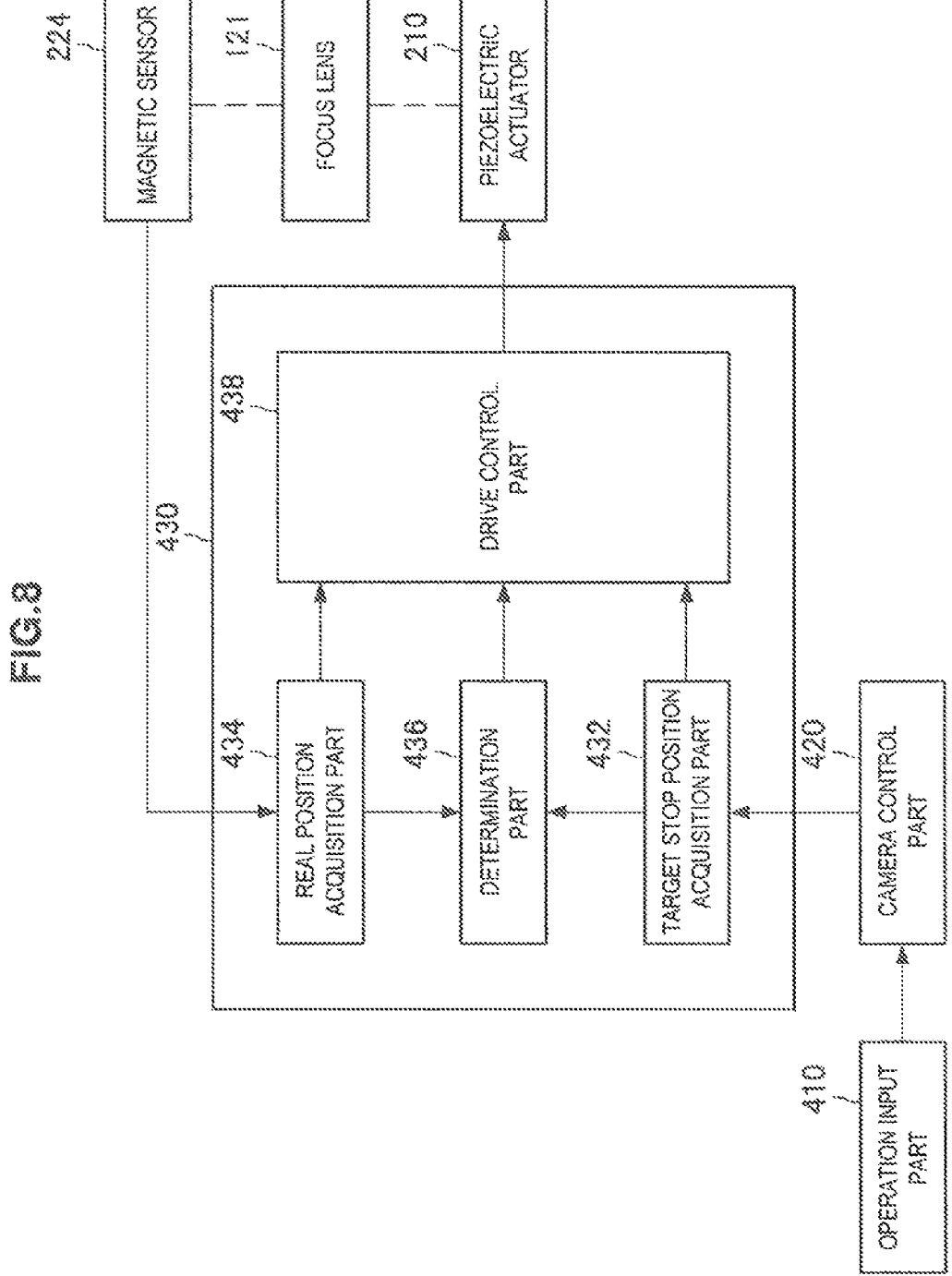
FIG. 8 is a block diagram illustrating one configuration example of a drive controller according to the embodiment.

On the basis of FIG. 8, a configuration of a drive controller 430 of the piezoelectric actuator 210 that drives the focus lens 121 according to the present embodiment will be described. FIG. 8 is a block diagram illustrating one configuration example of the drive controller 430 according to the present embodiment.

The drive controller 430 according to the present embodiment is a device that receives an arithmetic result of the contrast AF and the phase difference AF by a camera control part 420, and controls the piezoelectric actuator 210 such that the focus lens 121 is moved to the focusing position which is the target stop position and stopped. The drive controller 430 includes, as illustrated in FIG. 8, a target stop position acquisition part 432, a real position acquisition part 434, a determination part 436, and a drive control part 438.

The target stop position acquisition part 432 acquires the focusing position at which the focus lens 121 is actually desired to be stopped as the target stop position from the camera control part 420. The camera control part 420 carries out arithmetic processing of the contrast AF and the phase difference AF on the basis of operation input from an operation input part 410 of the digital still camera 100 by a user, and computes the focusing position at which the focus lens 121 is actually desired to be stopped. When the target stop position of the focus lens 121 is acquired from the camera control part 420, the target stop position acquisition part 432 outputs the target stop position to the determination part 436 and the drive control part 438.

The real position acquisition part 434 computes and acquires an actual position of the focus lens 121 driven by the piezoelectric actuator 210 (also called "the real position of the focus lens 121") on the basis of a detection result by the magnetic sensor 224. The real position acquisition part 434 outputs the acquired real position of the focus lens to the determination part 436 and the drive control part 438.

The determination part 436 compares the target stop position and the real position of the focus lens 121, and determines whether or not the target stop position matches with the real position. A determination method by the determination part 436 will be described later. The determination part 436 outputs a determination result to the drive control part 438.

The drive control part 438 controls the drive of the piezoelectric actuator 210 by controlling a voltage to be applied to the piezoelectric actuator 210 on the basis of the target stop position and the real position of the focus lens 121. The drive control part 438 computes the drive instruction value on the basis of the target stop position and the real position of the focus lens 121, and drives the piezoelectric actuator 210 on the basis of the drive instruction value. The position of the focus lens 121 moved by the drive of the piezoelectric actuator 210 is cyclically detected by the magnetic sensor 224, and is outputted to the real position acquisition part 434 each time. The processing is repeatedly executed until it is determined by the determination part 436 that the target stop position matches with the real position. Then, when it is determined by the determination part 436 that the target stop position matches with the real position, the drive control part 438 turns off the energization of the piezoelectric actuator 210.

(1.2.3. Focus Lens Drive Stop Control by Drive Controller)

Figure 9:
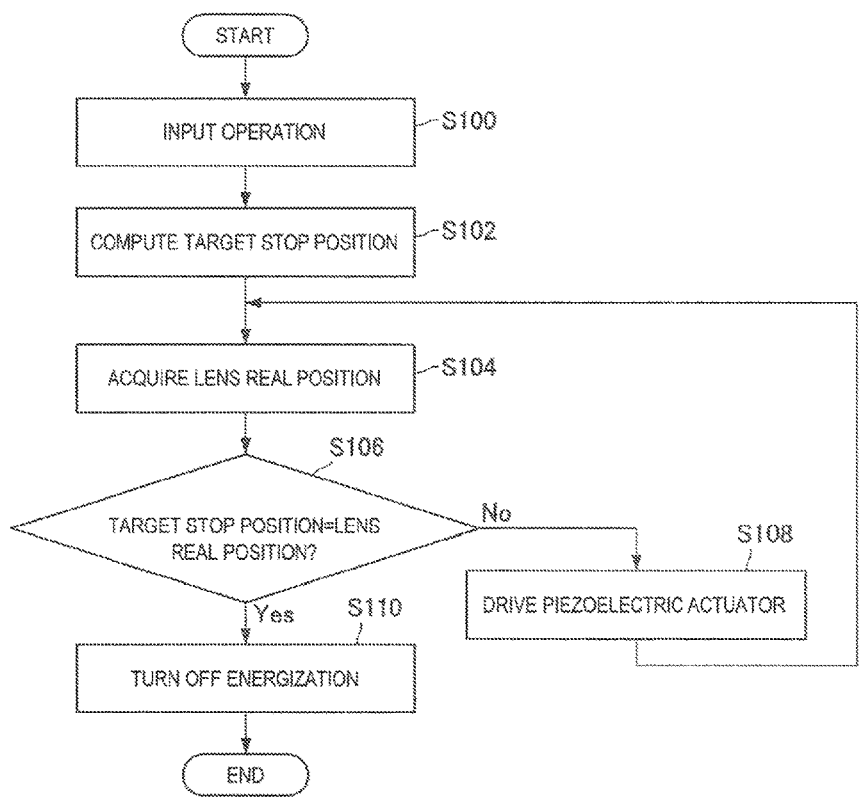
FIG. 9 is a flowchart illustrating processing of drive stop control of the focus lens by the drive controller according to the embodiment.

FIG. 9 illustrates processing of drive stop control of the focus lens 121 by the drive controller 430 according to the present embodiment.

The drive stop control of the focus lens 121 according to the present embodiment is started by receiving the operation input that may require position adjustment of the focus lens 121 for instance from the operation input part 410 of the digital still camera 100 by the user first, as illustrated in FIG. 9 (S100). The operation input part 410 outputs inputted operation input information to the camera control part 420.

The camera control part 420 which receives the operation input information carries out the arithmetic processing of the contrast AF and the phase difference AF, and computes the focusing position at which the focus lens 121 is actually desired to be stopped as the target stop position (S102). The camera control part 420 outputs the computed target stop position to the target stop position acquisition part 432 of the drive controller 430. When the target stop position of the focus lens 121 is acquired from the camera control part 420, the target stop position acquisition part 432 outputs the target stop position to the determination part 436 and the drive control part 438.

In the meantime, the drive controller 430 acquires a detection value of the magnetic sensor 224 by the real position acquisition part 432, and computes and acquires the real position of the focus lens 121 (S104). The real position acquisition part 434 outputs the acquired real position of the focus lens to the determination part 436 and the drive control part 438.

Then, the drive controller 430 compares the target stop position of the focus lens 121 acquired in step S102 and the real position of the focus lens 121 acquired in step S104 by the determination part 436 (S106). Then, the determination part 436 determines whether or not the target stop position and the real position of the focus lens 121 match with each other. The determination part 436 may, for instance, simply compare between the target stop position and the real position of the focus lens 121 that are acquired, and determine whether or not these values match with each other.

Alternatively, the determination part 436 may take a difference between the target stop position and the real position of the focus lens 121, and determine whether or not the target stop position matches with the real position on the basis of whether or not a sign of the difference value is inverted. Due to influence of detection timing of the magnetic sensor 224 or signal noise of the magnetic sensor 224 or the like, it is possible that the focus lens 121 passes by the focusing position without the target stop position and the real position completely matching with each other. Therefore, by computing a difference between the target stop position and the real position in real time during the drive of the focus lens 121 and determining a moment at which the sign of the difference value is inverted as the time when the target stop position matches with the real position, it is ensured that the focus lens 121 can be stopped at the focusing position.

For instance, in an example illustrated in FIG. 7, the determination part 436 computes the difference value by subtracting the real position from the target stop position of the focus lens 121. Thus, the difference value is a positive value until the real position of the focus lens 121 is in the target stop position. Then, when the real position of the focus lens 121 exceeds the target stop position, the difference value becomes a negative value. The determination part 436 determines that the target stop position matches with the real position at the timing at which the sign of the difference value between the target stop position and the real position of the focus lens 121 is inverted from being positive to negative.

Since the example in FIG. 7 illustrates the case that a focus position moves from a small value to a big value (that is, from bottom toward top), the determination part 436 determines the timing at which the sign of the difference value is inverted from being positive to negative. For instance, in the case that the focus position moves from a big value to a small value (that is, from top toward bottom), the difference value for which the real position is subtracted from the target stop position becomes the negative value until the real position of the focus lens 121 is in the target stop position. Then, when the real position of the focus lens 121 exceeds the target stop position, the difference value becomes the positive value. In this case, the determination part 436 determines the timing at which the sign of the difference value is inverted from being negative to positive.

Also, as another determination method, the case that the difference value between the target stop position and the real position of the focus lens 121 becomes equal to or smaller than a predetermined threshold value (coring) may be determined as the time when the target stop position matches with the real position. In this case, since it is difficult to achieve stop accuracy when exceeding the threshold (coring) of the focus lens 121, it is better to use the determination method by the above-described sign inversion system when high accuracy is demanded. A determination result in step S106 is outputted to the drive control part 438.

Thereafter, the drive control part 438 controls the voltage to be applied to the piezoelectric actuator 210 on the basis of the determination result in step S106. When it is determined that the target stop position and the real position of the focus lens 121 do not match with each other in step S106, the drive control part 438 computes the drive instruction value on the basis of the target stop position and the real position, and drives the piezoelectric actuator 210 on the basis of the drive instruction value (S108). Then, the processing from step S104 is repeatedly executed.

On the other hand, when it is determined that the target stop position and the real position of the focus lens 121 match with each other in step S106, the drive control part 438 turns off the energization of the piezoelectric actuator 210 (S110). Thus, the drive of the piezoelectric actuator 210 is stopped. At this time, since the drive shaft 212 of the piezoelectric actuator 210 is urged to the sliding contact surface 302 of the lens frame 300 by the urging member 230, the lens frame 300 can keep the position when the energization of the piezoelectric actuator 210 is turned off.

[1.3. Summary]

The configuration of the drive controller 430 of the drive part according to the first embodiment of the present disclosure and the operation thereof are described above. According to the present embodiment, in order to stop the focus lens 121 that is moved at the correct focusing position, the drive controller 430 executes control so as to turn off the voltage applied to the piezoelectric element 214 when the target stop position and the real position of the focus lens 121 match with each other. Thus, the focus lens 121 can be stopped at the correct focusing position in a short time. Also, by quickly moving and stopping the focus lens 121, the time during which the energization of the piezoelectric actuator 210 is turned off can be prolonged, and power consumption can be reduced.

2. Second Embodiment

Figure 10:
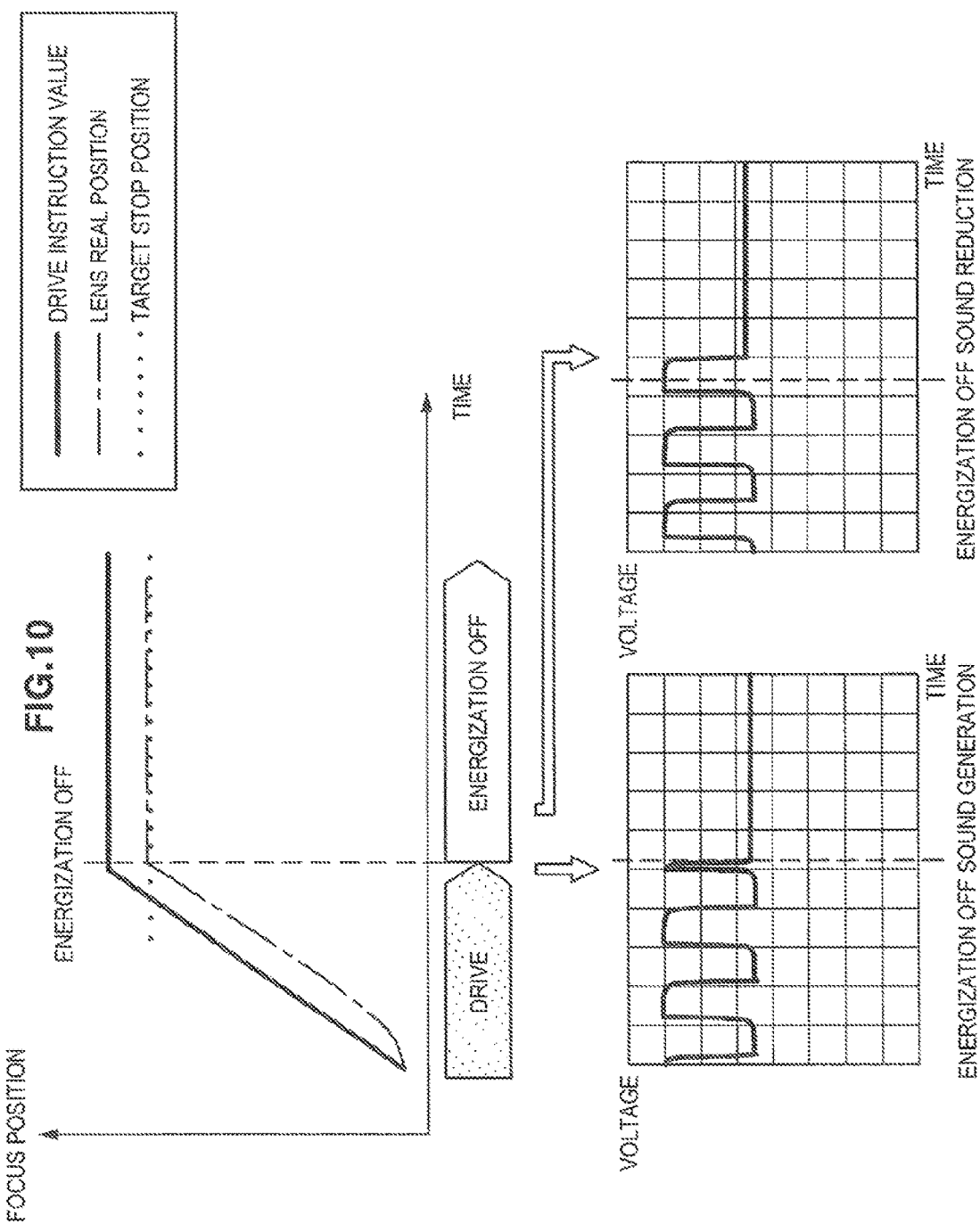
FIG. 10 is an explanatory diagram illustrating drive control by the drive controller according to a second embodiment of the present disclosure.

Next, on the basis of FIG. 10, the drive control method by the drive controller according to the second embodiment of the present disclosure will be described. FIG. 10 is an explanatory diagram illustrating drive control by the drive controller according to the present embodiment. The configuration of the drive controller according to the present embodiment and the imaging apparatus including the drive controller is the same as the configuration in the first embodiment illustrated in FIG. 1-FIG. 4 and FIG. 8, so that it is described using the same reference numerals and detailed descriptions are omitted.

In the case of adopting drive utilizing a PWM waveform as a drive method of the piezoelectric actuator 210, a drive voltage applied to the piezoelectric actuator 210 is indicated by a cyclic rectangular wave as in each graph indicated on a lower side of FIG. 10 for instance. Here, when the energization of the piezoelectric actuator 210 is turned off in the middle of one cycle of the rectangular wave, as in the graph indicated at the lower left of FIG. 10, a shape of the rectangular wave becomes a halfway shape. Such output affects an expansion and contraction operation of the piezoelectric actuator 210 and sound is generated when the energization is turned off.

Accordingly, in the drive controller 430 according to the present embodiment, as illustrated at the lower right of FIG. 10, the energization of the piezoelectric actuator 210 is turned off after the rectangular wave of the drive voltage is outputted for one cycle after the sign of the difference value between the target stop position and the real position of the focus lens 121 is inverted. That is, after it is determined that the target stop position and the real position of the focus lens 121 match with each other, at the point of time at which the value of the PWM waveform of the drive voltage cyclically applied to the piezoelectric actuator 210 becomes zero, the energization of the piezoelectric actuator 210 is turned off.

In this way, when it is determined that the target stop position and the real position of the focus lens 121 match with each other, the drive controller 430 according to the present embodiment does not turn off the energization of the piezoelectric actuator 210 immediately in the middle of output of the rectangular wave of the drive voltage for one cycle. The drive control part 438 of the drive controller 430 shifts the switching timing of a driver, and turns off the energization of the piezoelectric actuator 210 consistently at the timing at which the output of the waveform for one cycle is ended. Thus, influence on the expansion and contraction operation of the piezoelectric actuator 210 is reduced, and the sound generated when the energization of the piezoelectric actuator 210 is turned off is reduced.

In the drive control according to the present embodiment, there is a case that the time of turning off the energization of the piezoelectric actuator 210 is slightly delayed from the time when it is actually determined that the target stop position and the real position of the focus lens 121 match with each other. However, since the delay is sufficiently short time to the speed of focus, position control of the focus lens 121 is not greatly affected.

The timing of turning off the energization of the piezoelectric actuator 210 by the drive controller 430 according to the present embodiment is effective when the imaging apparatus is performing imaging in a moving image mode in particular. By the drive control, the sound generated when the energization of the piezoelectric actuator 210 is turned off does not obstruct the sound acquired together with images during the moving image mode.

3. Third Embodiment

Figure 11:
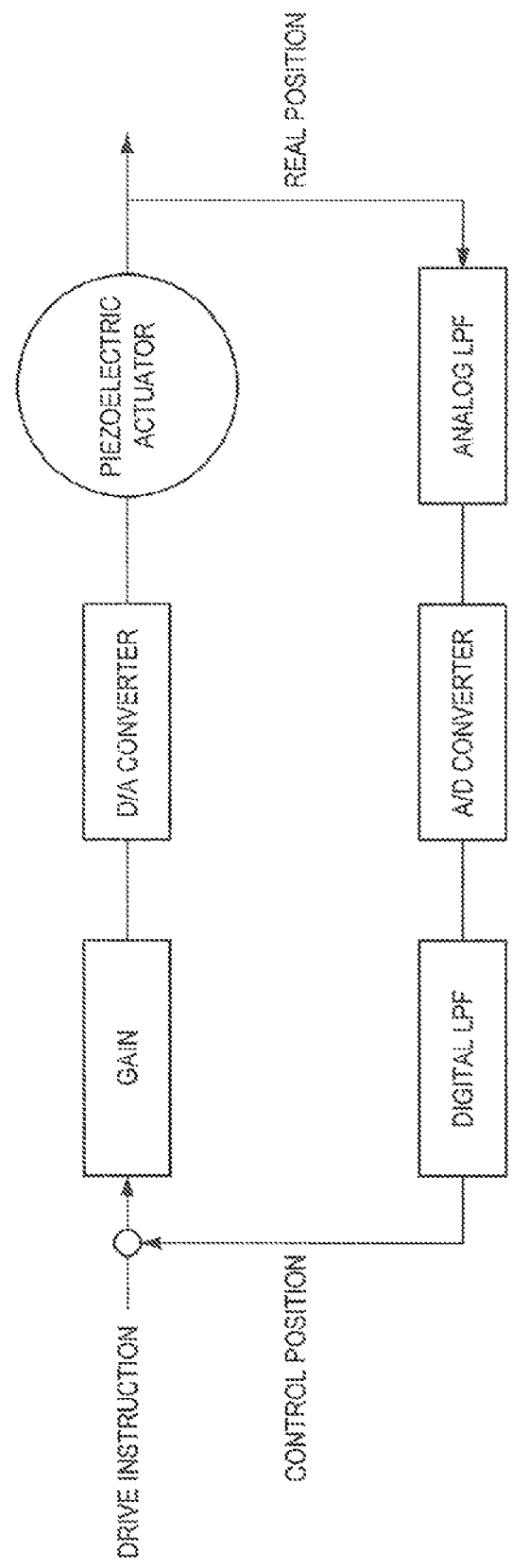
FIG. 11 is a control block diagram of the drive controller according to a third embodiment of the present disclosure.
Figure 12:
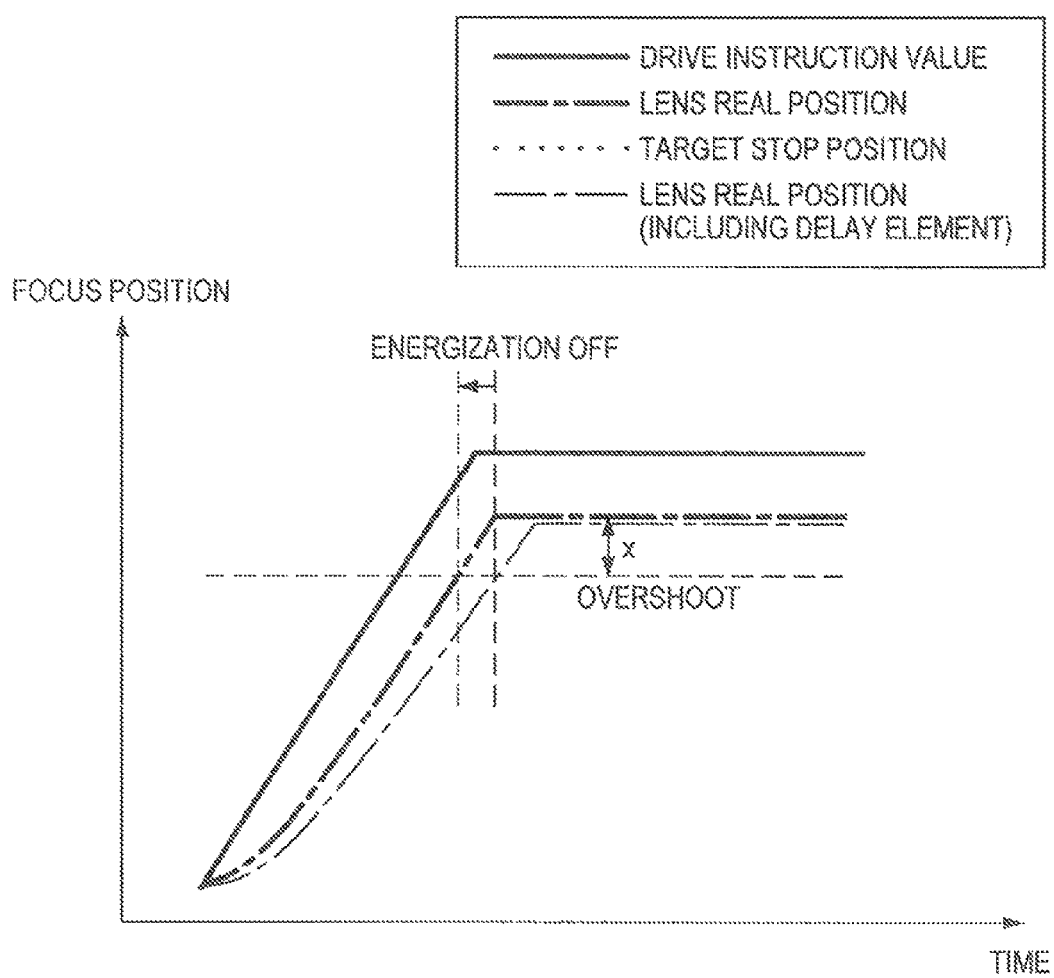
FIG. 12 is an explanatory diagram illustrating correction of a target stop position by the drive controller according to the embodiment.

On the basis of FIG. 11 and FIG. 12, the drive control method by the drive controller according to the third embodiment of the present disclosure will be described. FIG. 11 is a control block diagram of the drive controller according to the present embodiment. FIG. 12 is an explanatory diagram illustrating correction of the target stop position by the drive controller according to the present embodiment. Note that, in the present embodiment, the configuration of the drive controller and the imaging apparatus including the drive controller is the same as the configuration in the first embodiment illustrated in FIG. 1-FIG. 4 and FIG. 8, so that it is described using the same reference numerals and detailed descriptions are omitted.

A detection signal of the magnetic sensor 224 that is information on the real position of the focus lens 121 generally includes signal noise. In order to eliminate the signal noise, in the drive controller 430, as illustrated in FIG. 11, a low-pass filter (also called "LPF", hereinafter) is often applied to the detection signal of the magnetic sensor 224.

In the case of utilizing real position information of the focus lens 121 after applying the LPF, for determination of turning off of the energization of the piezoelectric actuator 210 according to the first embodiment, the real position of the focus lens 121 is delayed timewise from the original real position due to a delay element of the LPF. That is, while the real position of the focus lens 121 is a position indicated by a thick dashed line in FIG. 12, when the delay element of the LPF is included in the real position of the focus lens 121, time delay is generated as indicated by the dashed line. Therefore, when turning off of the energization of the piezoelectric actuator 210 is determined utilizing the information delayed by the LPF, the focus lens 121 is to be stopped past the target stop position by a distance x in FIG. 12.

In the meantime, a delay amount of the LPF is uniquely determined by a drive speed of the focus lens 121. Thus, it is possible to obtain the delay amount by calculation from design information of the LPF for the drive speed. Then, the drive controller 430 according to the present embodiment brings forward the timing of turning off the energization of the piezoelectric actuator 210 depending on the moving speed of the focus lens 121 when moving to the target stop position, and sets the target stop position by the delay amount before in the driving direction. Thus, the focus lens 121 can be accurately stopped at the focusing position which is the original target stop position.

The delay mount of the LPF is changed by a setting value of the LPF as well. Normally, the setting value of the LPF is not changed when it is once set. Therefore, the delay element generated by the setting may be taken into consideration when designing the LPF, to correct the target stop position.

Note that, as another method of avoiding overshooting of the focus lens 121 due to the delay element of the LPF, the following method can be considered. For instance, an advance compensator is introduced after a digital LPF illustrated in FIG. 11 to advance for the delay. Further, preceding information of an analog LPF illustrated in FIG. 11 may be used for information to be used to determine turning off of the energization of the piezoelectric actuator 210, and a value through the LPF illustrated in FIG. 11 may be used for position information of the focus lens 121 to be used for the servo operation. Thus, only the overshoot can be improved without damaging a servo performance.

The preferred embodiments of the present disclosure are described above in detail with reference to the appended drawings, but the technical scope of the present disclosure is not limited to the examples. It is clear that a person ordinarily skilled in the art of the present disclosure can conceive various kinds of change examples or correction examples within the scope of technical ideas described in the claims, and it is understood that they of course belong to the technical scope of the present disclosure.

For instance, while the lens drive method of the AF operation is described in the above-described embodiment, the present technology is not limited to the example. For instance, the present technology is applicable to various drive modes regarding a lens movable part such as manual focus and zoom operations or the like. By applying the drive control according to the embodiment, it is possible to obtain the effects similar to the present disclosure such as shortening of operation time, reduction of power consumption, and reduction of energization off sound.

Also, in the above-described embodiment, the drive controller that turns off the energization of the piezoelectric actuator 210 at the timing at which the target stop position and the real position of the focus lens 121 match with each other in the drive stop of the piezoelectric actuator 210 is described. The imaging apparatus according to the present technology may further include, other than the drive controller according to the above-described embodiment, a second drive controller that controls the piezoelectric actuator 210 so that the focus lens 121 is stopped at the target stop position by feedback control based on a detection result of the position sensor.

At this time, the imaging apparatus controls the piezoelectric actuator 210 by either one of the drive controller according to the above-described embodiment and the second drive controller on the basis of a function state of the imaging apparatus. Since the drive controller according to the above-described embodiment turns off the energization of the piezoelectric actuator 210 instantaneously when the target stop position and the real position of the movable body match with each other, it is better to apply the drive controller when the movable body moves in a little amount. For instance, the piezoelectric actuator 210 is controlled by the drive controller according to the above-described embodiment in a still image photographing mode of photographing still images, and the piezoelectric actuator 210 is controlled by the second drive controller in a moving image photographing mode of photographing moving images.

When photographing the moving images with the possibility that the focus lens 121 is frequently driven, the energization of the piezoelectric actuator 210 is turned off after the movement of the movable body is converged. On the other hand, when photographing the still images, the energization of the piezoelectric actuator 210 is turned off when the real position of the movable body is in the target stop position, so that the power consumption can be reduced.

Also, the effects described in this specification are only explanations or examples and are not definite. That is, the technology according to the present disclosure can demonstrate other effects that are clear to those skilled in the art from descriptions of this specification, together with the above-described effects, or instead of the above-described effects.

Additionally, the present technology may also be configured as below.

(1) A drive controller including:
a determination part that compares a target stop position of a movable body, which is driven by a piezoelectric actuator driven by a piezoelectric element expanded and contracted in response to an applied voltage, with a real position of the movable body acquired on the basis of a position sensor, and determines whether or not the target stop position matches with the real position; and
a drive control part that turns off energization of the piezoelectric actuator when the target stop position matches with the real position while the movable body is being driven by the piezoelectric actuator.

(2) The drive controller according to (1),
wherein the determination part repeatedly calculates a difference between the target stop position and the real position, and when a sign of the difference is inverted, determines that the target stop position matches with the real position.

(3) The drive controller according to (1) or (2),
wherein the target stop position is a position where the movable body is actually stopped, which is set separately from a drive instruction value which is a target control position of the movable body by servo control.

(4) The drive controller according to any one of (1) to (3),
wherein, when the target stop position matches with the real position, the drive control part turns off the energization of the piezoelectric actuator at a point of time at which a value of a waveform of a drive voltage cyclically applied to the piezoelectric actuator becomes zero after a point of time of the match.

(5) The drive controller according to any one of (1) to (4),
wherein the determination part corrects the target stop position in response to a delay element of the position sensor that detects the real position.

(6) The drive controller according to (5),
wherein a correction amount of the target stop position is calculated on the basis of a moving speed of the movable body.

(7) The drive controller according to any one of (1) to (6), including
a second drive control part that controls the piezoelectric actuator so that the movable body is stopped at the target stop position by feedback control based on a detection result of the position sensor,
wherein the piezoelectric actuator is controlled by either one of the drive control part and the second drive control part, on the basis of a function state of a device provided with the movable body.

(8) An imaging apparatus including:
an imaging unit;
a lens part composed of one or more lenses that transmit light incident on the imaging unit;
a plurality of drive parts that move a movable body that holds the imaging unit and the lenses respectively and moves in a predetermined direction respectively; and
a plurality of drive control parts that control the individual drive parts respectively,
wherein at least one of the drive parts is a piezoelectric actuator that drives the movable body with a piezoelectric element expanded and contracted in response to an applied voltage, and
wherein the drive control part of the piezoelectric actuator includes
a determination part that compares a target stop position of the movable body with a real position of the movable body acquired on the basis of a position sensor, and determines whether or not the target stop position matches with the real position, and
a drive control part that turns off energization of the piezoelectric actuator when the target stop position matches with the real position while the movable body is being driven by the piezoelectric actuator.

(9) The imaging apparatus according to (8),
wherein the piezoelectric actuator is composed of the piezoelectric element and a drive shaft to be driven by the piezoelectric element, and
wherein the imaging apparatus includes an urging member that urges the drive shaft to the movable body with fixed urging force.

(10) A drive control method including:
comparing a target stop position of a movable body, which is driven by a piezoelectric actuator driven by a piezoelectric element expanded and contracted in response to an applied voltage, with a real position of the movable body acquired on the basis of a position sensor, and determining whether or not the target stop position matches with the real position; and
turning off energization of the piezoelectric actuator when the target stop position matches with the real position while the movable body is being driven by the piezoelectric actuator.

What is claimed is:
1. A lens unit apparatus, comprising:
at least one lens including a focus lens;
a fixing member;
a movable body on the fixing member,
wherein the movable body is configured to hold the focus lens, and
wherein the movable body is movable in a direction parallel to an optical axis of the at least one lens;
a position sensor configured to determine a current position of the movable body with respect to the fixing member;
a focus lens actuator configured to move the movable body in the direction parallel to the optical axis of the at least one lens; and
circuitry configured to:
control the focus lens actuator;
correct a target focus position of the movable body based on a delay associated with the position sensor; and turn off energization of the focus lens actuator, while the movable body is in motion, based on a determination that the current position of the movable body matches the corrected target focus position of the movable body.

2. The lens unit apparatus according to claim 1, wherein the circuitry is further configured to turn off the energization based on a value of a waveform of a drive voltage.

3. The lens unit apparatus according to claim 2, wherein the circuitry is further configured to turn off, based on the match of the target focus position with the current position, the energization of the focus lens actuator at a first point of time at which the value of the waveform of the drive voltage cyclically applied to the focus lens actuator becomes zero, and wherein the first point of time is after a second point of time of the match of the target focus position with the current position.

4. The lens unit apparatus according to claim 1,
wherein the position sensor is a magnetic position sensor,
wherein the fixing member is configured to hold the magnetic position sensor, and
wherein the movable body is further configured to hold a magnet.

5. The lens unit apparatus according to claim 1, wherein the circuitry is further configured to:
repeat calculation of a difference between the target focus position and the current position; and
determine that the target focus position matches with the current position based on a determination that a sign of the difference between the target focus position and the current position is inverted.

6. The lens unit apparatus according to claim 1,
wherein the target focus position is a position where the movable body is stopped, and
wherein the target focus position is set, separately from a drive instruction value which is a focus control position of the movable body, based on a servo control.

7. The lens unit apparatus according to claim 1, wherein calculation of a correction amount of the target focus position is based on a moving speed of the movable body.

8. The lens unit apparatus according to claim 1,
wherein the circuitry is further configured to:
control the focus lens actuator to stop the movable body at the target focus position, based on a feedback control and a detection result of the position sensor; and
control the focus lens actuator based on a function state of a device with the movable body.

9. The lens unit apparatus accordingly to claim 1, wherein the focus lens actuator is a piezoelectric actuator that is configured with a piezoelectric element, and wherein expansion and contraction of the piezoelectric element are based on an applied voltage.

10. The lens unit apparatus accordingly to claim 9, wherein the applied voltage is a pulse width modulated (PWM) waveform with periodic rectangular waves of the applied voltage to the piezoelectric actuator.

11. The lens unit apparatus accordingly to claim 10, wherein the turn off of the energization of the piezoelectric actuator includes turn off of the PWM waveform of the applied voltage to the piezoelectric actuator at an end of a cycle associated with the periodic rectangular waves.

12. The lens unit apparatus accordingly to claim 1, wherein the circuitry is further configured to obtain the target focus position from a camera control part based on a type of autofocus employed, and wherein the type of autofocus is at least one of a Contrast Autofocus or a Phase Difference Autofocus.

13. The lens unit apparatus accordingly to claim 1, further comprising a low-pass filter (LPF) configured to filter a detection result of the position sensor.

14. The lens unit apparatus accordingly to claim 1, wherein change in the delay is based on a setting value of a low pass filter (LPF).

15. The lens unit apparatus accordingly to claim 1, wherein the current position is delayed timewise from an original current position based on the delay.

16. The lens unit apparatus accordingly to claim 1, wherein the delay is based on a drive speed of the focus lens.

17. An imaging apparatus, comprising:
an imaging unit;
a lens part which comprises at least one lens including a focus lens;
a fixing member;
a movable body on the fixing member,
wherein the movable body is configured to hold the focus lens, and
wherein the movable body is movable in a direction parallel to an optical axis of the at least one lens;
a position sensor configured to determine a current position of the movable body with respect to the fixing member;
a focus lens actuator configured to move the movable body in the direction parallel to the optical axis of the at least one lens; and
circuitry configured to:
control the focus lens actuator;
correct a target focus position of the movable body based on a delay associated with the position sensor; and
turn off energization of the focus lens actuator, while the movable body is in motion, based on a determination that the current position of the movable body matches with the corrected target focus position of the movable body.

18. The imaging apparatus according to claim 17, further comprising an urging member,
wherein the focus lens actuator comprises a focus lens element and a drive shaft,
wherein the focus lens element is configured to drive the drive shaft, and
wherein the urging member is configured to control movement of the drive shaft to the movable body with a fixed urging force.

19. A drive control method for a lens unit, comprising:
moving a movable body in a direction parallel to an optical axis of at least one lens,
wherein the movable body is configured to hold the at least one lens of the lens unit including a focus lens;
determining a current position of the movable body with respect to a fixing member based on a position sensor;
correct a target focus position of the movable body based on a delay associated with the position sensor; and
turning off energization of a focus lens actuator, while the movable body is in motion, based on a determination that the current position of the movable body matches with the corrected target focus position of the movable body.

* * * * *